United States Patent [19]

Belart

[11] 4,347,779

[45] Sep. 7, 1982

[54] VACUUM BRAKE BOOSTER

[75] Inventor: Juan Belart, Walldorf, Fed. Rep. of Germany

[73] Assignee: ITT Industries, Inc., New York, N.Y.

[21] Appl. No.: 141,830

[22] Filed: Apr. 21, 1980

[30] Foreign Application Priority Data

May 10, 1979 [DE] Fed. Rep. of Germany ....... 2918912

[51] Int. Cl.³ ...................... F15B 13/16; F01B 19/00; F16J 3/02
[52] U.S. Cl. .................................... 91/369 A; 92/48; 92/99; 60/554
[58] Field of Search ............. 91/369 A, 396 B, 369 R, 91/376 R; 92/166, 165 R, 165 PR, 99, 48; 60/554, 547 R, 563

[56] References Cited

U.S. PATENT DOCUMENTS

| 3,482,485 | 12/1969 | Abbot | 91/369 R |
| 3,537,358 | 11/1970 | Bunyard | 92/166 |
| 4,173,172 | 11/1979 | Ohmi | 91/369 A |

FOREIGN PATENT DOCUMENTS

| 2845794 | 4/1979 | Fed. Rep. of Germany ... 91/369 A |
| 2922299 | 12/1979 | Fed. Rep. of Germany ... 91/369 A |
| 2031086 | 3/1980 | United Kingdom .................. 60/563 |

Primary Examiner—Paul E. Maslousky
Attorney, Agent, or Firm—John T. O'Halloran; Alfred C. Hill

[57]  ABSTRACT

To reduce the overall weight of a vacuum brake booster, the booster housing is provided with an axially extending central tube connecting the end walls of the housing in order to transmit the occurring axial forces. Two separate pistons are provided, a differential pressure piston surrounding the tube and a control valve piston disposed in the bore of the tube. Both pistons are connected with one another by radial pins extending through axial slots in the tube. The differential pressure piston is sealed by a diaphragm which progressively covers the slots when this piston moves in an operational direction. This arrangement reduces the axial length of the booster housing.

25 Claims, 3 Drawing Figures

VACUUM BRAKE BOOSTER

BACKGROUND OF THE INVENTION

The present invention relates to a vacuum brake booster for an automotive vehicle comprising a vacuum casing having a movable wall therein and a tube connecting both end walls of the casing. The movable wall divides the vacuum casing into a vacuum chamber and a working chamber, the pressure in the working chamber being controllable by a valve, and a force which is proportional to the differential of pressure in the two chambers acts on the movable wall which is sealed and slidable relative to the tube and mechanically connected with the valve housing arranged within the tube by cross members guided in axial slots of the tube.

Brake booster for automotive vehicles wherein the differential of pressure between a vacuum and atmospheric pressure produces an additional force are known. The brake booster comprises a vacuum casing, a movable wall arranged therein, and a valve. The vacuum casing is mostly of tubular design, with its two end walls serving as fastenings. The brake booster conventionally has its one end wall where the valve is provided fastened to the automotive vehicle's splashboard, while the master brake cylinder is fastened to the other end wall of the brake booster. A movable wall divides the interior of the vaccum casing into a vacuum chamber in which a constant pressure prevails and a working chamber.

The pressure in the working chamber is variable dependent upon the valve which is actuated by the brake pedal. Like the pedal force which acts on a push rod via the valve, the force acting on the movable wall in the presence of a pressure differential is transmitted to the master brake cylinder via the push rod which is axially disposed in the vacuum casing.

The vacuum casing is conventionally of sheet steel. As a result of the pressure differential between the atmospheric pressure prevailing outside the vacuum casing and the vacuum, forces will be produced causing a deformation of the vacuum casing. In addition to the forces caused by the pressure differential, further forces transmitted via the push rod occur during brake actuation, i.e., the brake pedal force and the boosted force generated by the brake booster. The sum of the forces acts on the piston of the master cylinder, generating in the master cylinder a reaction force of the same magnitude, yet acting in the opposite direction.

The portion of the reaction force coming from the pedal force is transferred from the master cylinder via the sheet parts of the vacuum casing to the splashboard where the brake pedal is also fastened. The portion of the reaction force coming from the booster force ends at the vacuum casing. The reaction force which takes its course via the vacuum casing causes an extension of the vacuum casing in an axial direction during brake actuation, resulting in displacement of the master cylinder and consequently in an additional lost travel of the brake pedal. Because of the brake lever transmission ratio, the extension of the vacuum casing will be multiplied when transmitted to the brake pedal.

It has been proposed in the U.S. copending application Ser. No. 061,113, filed July 26, 1979, to provide in the vacuum casing a tube extending in an axial direction and connected to the end walls of the vacuum casing with the movable wall sealed relative to, and slidably arranged on, the tube.

SUMMARY OF THE INVENTION

An object of the present invention is to provide a brake booster that reduces the overall length of the brake booster of the above-cited copending application while maintaining its operability and safety.

Another object of the present invention is to provide a brake booster that will also maintain or further reduce the weight reduction achieved by the brake booster of the above-cited copending application.

A feature of the present invention is the provision of a vacuum brake booster comprising a housing having a longitudinal axis and two end walls transversed to the axis; a tube disposed in the housing coaxial of the axis connected between the two end walls; a movable wall disposed in the housing coaxial of the axis in a sealed, slidable relationship with the outer surface of the tube, the movable wall dividing the housing into a vacuum chamber and a working chamber; a valve housing disposed within the tube containing therein a valve to control the pressure in the working chamber to generate a force proportional to the differential pressure in the vacuum and working chambers to act on the movable wall; slots through the outer surface of the tube disposed in the vacuum chamber; cross members extending through and guided in the slots to interconnect the valve housing and the movable wall on the vacuum side of the movable wall; and a first rolling diaphragm to provide a seal between the movable wall and the tube and to cover the slots in a sealing manner when the movable wall is displaced in an operative direction.

In order to ensure that the rolling diaphragm is safely secured to the tube, the tube may be provided with a stepped fastening. The tube may be provided with radially inwardly extending projections to guide the valve housing, or the valve housing may be provided with radially outwardly extending projections to guide the valve housing in the tube. Alternatively, the tube may be suitably provided with a radially inwardly extending projection to guide the valve housing, and the valve housing may be provided with a radially outwardly extending projection to guide the valve housing in the tube. The projection provided at the valve housing may at the same time be used for receiving the cross members which connect the valve housing with the movable wall. The cross members are preferably designed as pins holding, in a particularly advantageous embodiment, a bushing and a sheet member together, with the sheet member urging the movable wall against the bushing.

Disposed at the projection of the tube for guiding the valve housing is a sealing member to provide a seal between the valve housing and the portion of the tube close to the working chamber. At its end close to the pedal, the tube is connected to the valve housing through a rolling diaphragm so that an annular chamber is formed between the rolling diaphragm and the slide seal. The annular chamber between valve housing and tube is connected to the working chamber through one or several openings, and to the valve itself through a channel in the valve housing. An axial bore in the valve housing leads to the vacuum chamber. For this reason, the valve housing can be kept narrow and in addition receive the reaction disc for the transmission of the forces from the brake pedal and from the brake booster to the push rod which leads to the master brake cylinder.

For ease of assembly of the booster, the bushing, the sheet parts and the diaphragm plate include recesses which are conformed to the fastening lugs of the tube.

A further object of the present invention is to provide a brake booster with two booster units, with the length of the tube remaining unchanged. This object is achieved by another feature of the present invention in that the outer wall of the vacuum casing surrounds both booster units and the inner edge of this outer wall forms a tubular projection extending up to the end of the tube. Preferably, the movable wall of the additional booster unit has on its inner edge a tubular projection likewise held in the stop bushing by the pins. For greater ease of assembly, the fastening end of the tubular projection may be designed as a bayonet catch for locking engagement into the pins. The diameter of the tubular projection of the outer wall is suitably smaller than the diameter of the tubular projection of the additional diaphragm plate. It is thereby achieved that a gap remains between the two tubular projections to connect the additional vacuum chamber with the other vacuum chamber.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
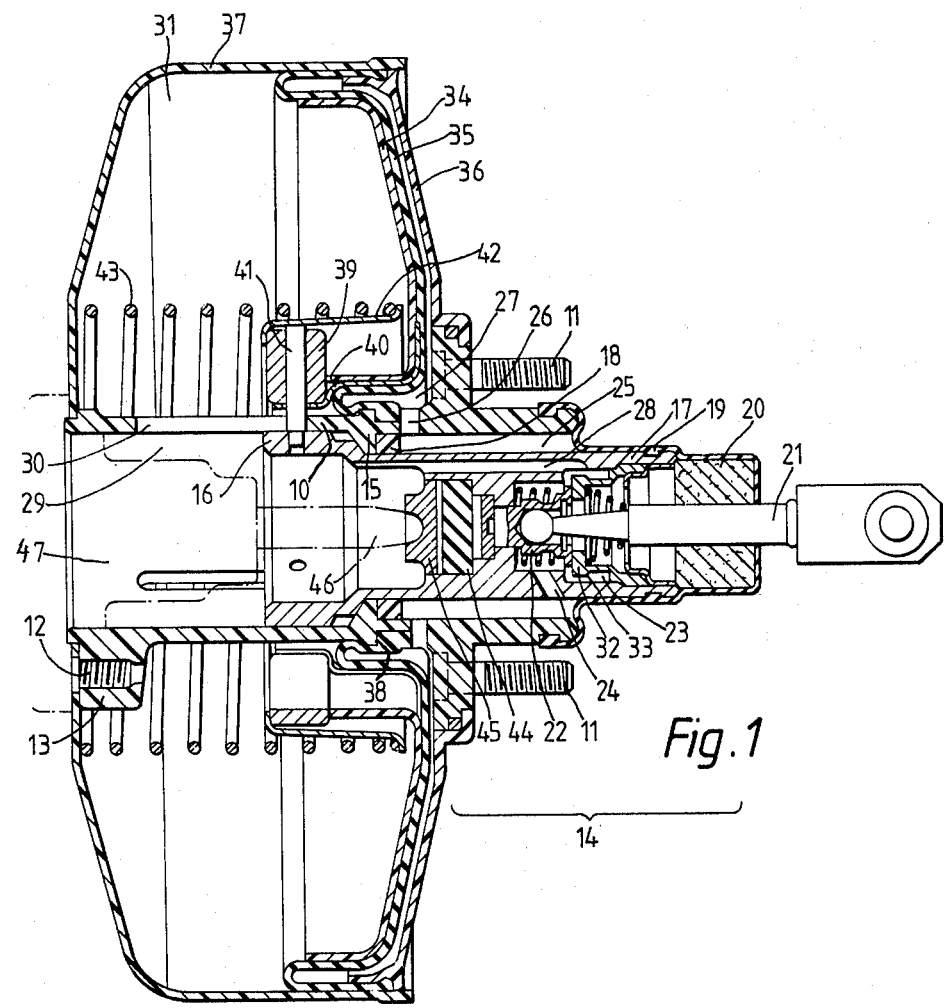
FIG. 1 is a longitudinal cross sectional view of a brake booster in accordance with the principles of the present invention.
Figure 2:
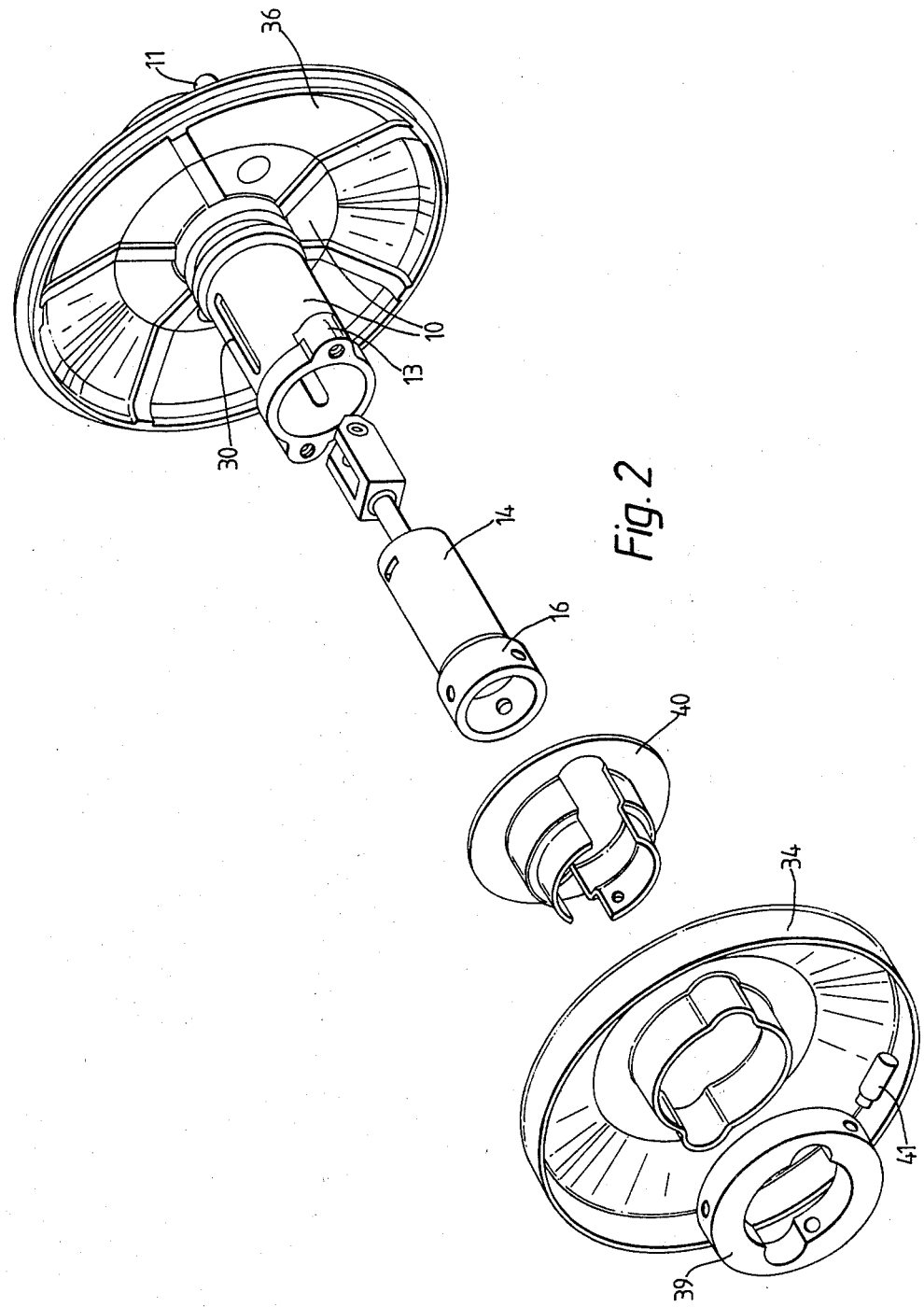
FIG. 2 is a perspective view of some component parts of the brake booster of FIG. 1.

In the brake booster illustrated in FIGS. 1 and 2, tube 10 represents the central support. By means of screw 11, tube 10 and, thus, the brake booster are fastened to the automotive vehicle, for example, to the splashboard or fire wall. The master brake cylinder (not shown) is secured to the opposite wall of the brake booster by means of screws adapted to be screwed into bores 12 of fastening lugs 13. Valve 14 is axially slidably carried in tube 10. The two parts are guided in opposite direction by means of projections 15 on tube 10 and projections 16 on valve housing 17. A seal 18 is provided on projection 15. On the tube and valve sides close to the pedal, the seal between tube 10 and valve 14 is accomplished by rolling diaphragm 19, which incorporates therein air filter 20. The rod 21 coming from the brake pedal is guided into the interior of valve 14 through air filter 20. In the inactive state of valve 14, the two annular chambers 22 and 23 of the valve are connected with each other. Chambers 22 and 23 are also connected to working chamber 27 through working chamber channel 24, annular chamber 25 and bore 26 in tube 10. Additionally, chambers 22 and 23 are connected to vacuum chamber 31 through axial bore 28, the interior 29 of tube 10 and the axial slots 30 in tube 10. When the brake pedal is actuated, annular chamber 23 is isolated from annular chamber 22 by means of seal 32. With further actuation of rod 21, valve 33 will open, and atmospheric pressure will enter into working chamber 27 through filter 20, open valve 33, working chamber channel 24 and annular chamber 25. Consequently with the vacuum prevailing in vacuum chamber 31, a differential pressure will be generated between working chamber 27 and vacuum chamber 31, and a force corresponding to this differential pressure will be transmitted to valve housing 17 by the movable wall consisting of diaphragm plate 34 and rolling diaphragm 35. The outer periphery of rolling diaphragm 35 is squeezed between cap 36 and vacuum casing 37. The inner edge of rolling diaphragm 35 is fastened in an annular groove 38 of tube 10. Diaphragm plate 34 bears against bushing 39 and is urged against bushing 39 via a sheet member 40, with bushing 39, sheet member 40 and valve member 16 being connected to each other via pins 41 guided in axial slots 30 of tube 10. The forces are transmitted from diaphragm plate 34 to valve housing 17 via pins 41 and bushing 39. Instead of pins 41, finger-type sheet parts may be used which form part of the diaphragm plate 34.

Tube 10, cap 36, vacuum casing 37 and diaphragm plate 34 may be made of plastic.

Both actuating rod 21 and valve housing 17 act on rubber disc 44 which adds both forces, transmitting them, through the pressure member 45 and push rod 46, shown in broken lines, to master cylinder 47 which is likewise illustrated in broken lines.

Return spring 43 is arranged between housing 37 and spring plate 42 which bears against bushing 39.

When plate 34 is moved in an operative direction (to the left in FIG. 1), member 40 and diaphragm 35 also move in this direction. Member 40 has an inwardly directed curved portion adjacent pin 41 bearing on diaphragm 35 which exerts an inwardly directed force on diaphragm 35 to thereby cause diaphragm 35 to cover slots 30 in a positively sealed relationship during operation of the booster.

Figure 3:
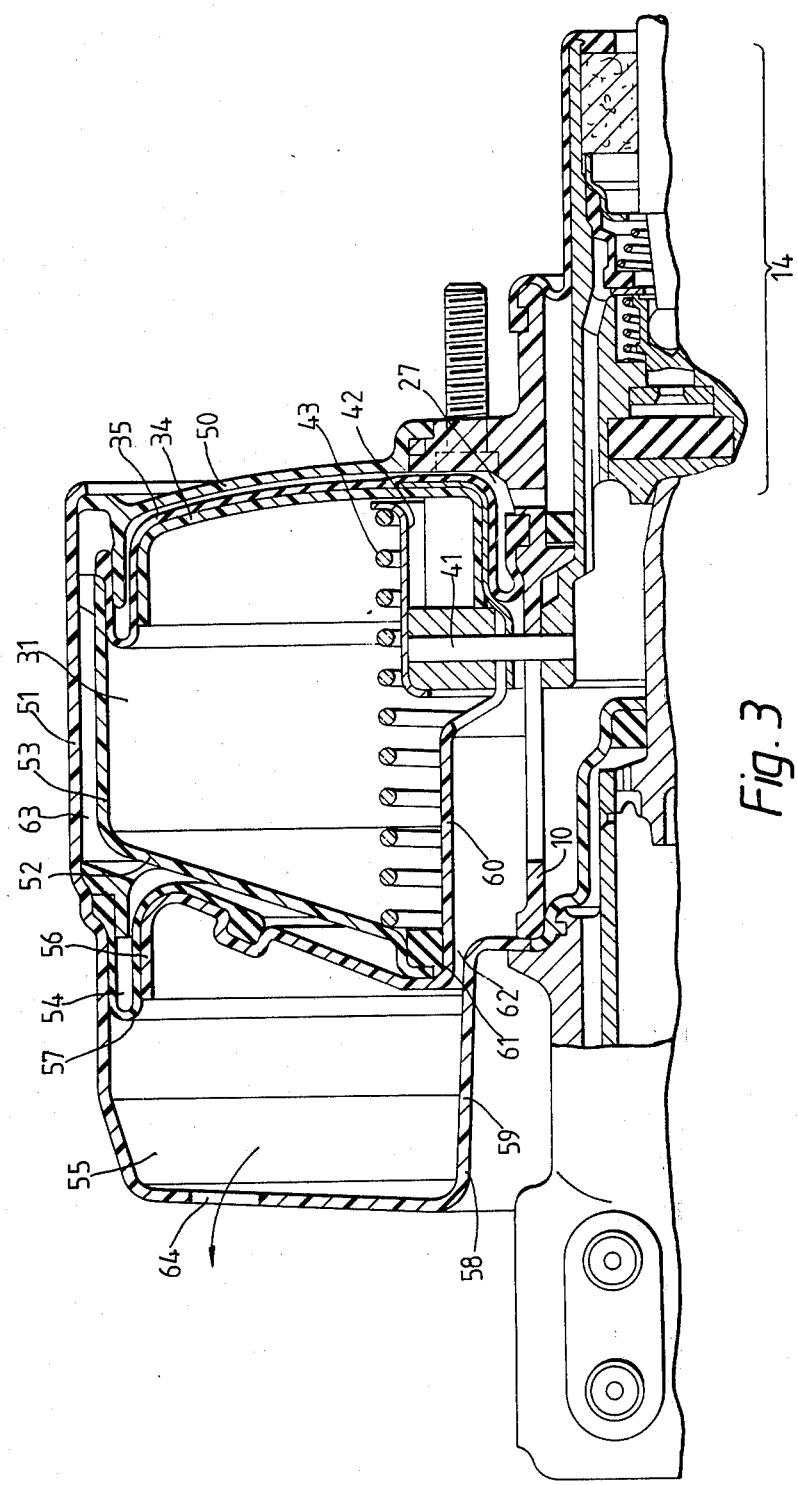
FIG. 3 is a partial longitudinal cross sectional view of a tandem-type brake booster in accordance with the principles of the present invention.

FIG. 3 illustrates an embodiment of a tandem-type brake booster including two booster units in accordance with the principles of the present invention. The structure of valve 14 corresponds to that of valve 14 of FIG. 1 so that it need not be dealt with in detail. Additionally, tube 10 is identical with tube 10 of FIG. 1. The design of cap 50 is, however, different from cap 36 of FIG. 1. Cap 50 is required to carry not only the outer wall 51 but also the central partition wall 52 separating the two booster units. Partition wall 52 is connected to cap 50 via a tubular projection 53 and is secured to cap 50 together with rolling diaphragm 35. Outer wall 51 encloses also the second booster unit including working chamber 54 and vacuum chamber 55 as well as diaphragm plate 56 and rolling diaphragm 57. The inner edge 58 of outer wall 51 is designed as a tubular projection 59 and terminates at the end of tube 10 close to the master brake cylinder. Diaphragm plate 56 of the second booster unit possesses likewise a tubular projection 60. Tubular projection 60 is at its open end of bayonet-type design enabling it to be fastened to pins 41. Provided between tubular projection 60 and central wall 52 is a seal 61 sealing vacuum chamber 31 relative to working chamber 54. Return spring 43 is situated between central wall 52 and spring plate 42. The connection between vacuum chamber 55 and vacuum chamber 31 is established through gap 62 which is maintained between tubular projection 59 of outer wall 51 and tubular projection 60 of diaphragm 57, and through the interior of tube 10. Working chamber 54 is connected to working chamber 27 through gap 63 existing between tubular projection 53 of central wall 52 and outer wall 51. Additional valves for the tandem version are not necessary.

The air for generation of the vacuum is drawn from opening 64.

Tube 10, cap 50 housing 51, partition wall 52 as well as diaphragm plates 34 and 56 may be made of plastics.

Rolling diaphragm 34 is connected to cap 36 or 50 by providing indentations therein.

While I have described above the principles of my invention in connection with specific apparatus, it is to be clearly understood that this description is made only by way of example and not as a limitation to the scope of my invention as set forth in the objects thereof and in the accompanying claims.

I claim:

1. A vacuum brake booster comprising:
   a housing having a longitudinal axis and two end walls transverse to said axis;
   a tube disposed in said housing coaxial of said axis connected between said two end walls;
   a movable wall disposed in said housing coaxial of said axis to divide said housing into a vacuum chamber and a working chamber;
   a valve housing disposed within said tube containing therein a valve to control the pressure in said working chamber to generate a force proportional to the differential pressure in said vacuum and working chambers to act on said movable wall;
   slots through the outer surface of said tube disposed in said vacuum chamber;
   cross members extending through and guided in said slots to interconnect said valve housing and said movable wall on the vacuum side of said movable wall; and
   said movable wall includes a diaphragm plate, a first rolling diaphragm disposed on one surface of said diaphragm plate disposed in said working chamber to provide a seal between said movable wall and said tube and at least one component disposed between said one surface and said first rolling diaphragm, said one component exerting an inwardly directed force on said first rolling diaphragm to cover said slots in a positively sealed relationship when said movable wall is displaced in an operative direction.

2. A booster according to claim 1, wherein:
   said tube includes a step in which said first rolling diaphragm is fastened.

3. A booster according to claim 1, wherein:
   said tube includes at least one inwardly extending projection to guide said valve housing therein.

4. A booster according to claim 1, wherein:
   said tube includes a radially inwardly extending projection to guide said valve housing therein, and
   said valve housing includes a radially outwardly extending projection to guide said valve housing in said tube.

5. A booster according to claim 4, wherein:
   said projection of said valve housing is provided by the end of said valve housing in said tube having a larger diameter than the remainder of said valve housing.

6. A booster according to claim 5, wherein:
   a first annular chamber is formed between said valve housing and said tube adjacent said working chamber having one end thereof defined by said projection of said tube, and
   a seal is disposed in said first annular chamber at said projection of said tube to seal said first annular chamber relative to said tube and said valve housing.

7. A booster according to claim 6, wherein:
   the other end of said first annular chamber is sealed by a second rolling diaphragm fastened between said tube and said valve housing.

8. A booster according to claim 7, wherein:
   an air filter is disposed in the end of said valve housing remote from said large diameter end, and
   said second rolling diaphragm seals said air filter to said valve housing.

9. A booster according to claim 8, wherein:
   said first annular chamber is connected to said working chamber by at least one radial opening through the wall of said tube and to a second annular chamber inside said valve housing through a channel in a wall of said valve housing.

10. A booster according to claim 9, wherein:
    an inner chamber of said tube is connected to said vacuum chamber through said slots and to a third annular chamber inside said valve housing through an axial bore of said valve housing.

11. A booster according to claim 10, wherein:
    the outer surface of said valve housing is a sliding surface for said seal.

12. A booster according to claim 5, wherein:
    said cross members include pins screwed down through said one component of said movable wall and into said larger diameter end of said valve housing.

13. A booster according to claim 12, wherein:
    said one component of said movable wall includes a sheet member urging said movable wall against bushing, and
    said pins hold said bushing and said sheet member together.

14. A booster according to claim 13, further including:
    a member disposed in the smaller diameter portion of said valve housing to add together a force generated by an actuating rod and said force generated by said differential pressure.

15. A booster according to claim 14, further including:
    a return spring disposed between one of said end walls remote from said valve housing and a spring plate abutting said bushing.

16. A booster according to claim 15, wherein:
    an end of said tube adjacent said one of said end walls includes therein fastening lugs to which a master brake cylinder can be fastened.

17. A brake booster having two booster units separated by a common wall arranged in tandem and according to claim 1, wherein:
    an outer wall of said housing encloses both of said two booster units and an inner portion of said outer wall forms a first tubular projection adjacent to and coaxial of said axis extending up to an end of said tube remote from said valve housing.

18. A booster according to claim 17, wherein:
    the additional one of said two booster units includes a second movable wall having on an inner portion thereof a second tubular projection adjacent to and coaxial of said axis and outside said tube held in position by said cross members.

19. A booster according to claim 18, wherein:

said second tubular projection includes a bayonet catch for locking engagement into said cross members.

20. A booster according to claim 18, wherein:
said common wall includes on an outer portion thereof a third tubular projection coaxial of and spaced from said axis which is connected to an end wall of said housing adjacent said valve housing.

21. A booster according to claim 20, further including:
a return spring disposed between said common wall and a spring plate associated with said cross members.

22. A booster according to claim 21, wherein:
a slide seal is disposed between the inner edge of said common wall and said second projection.

23. A booster according to claim 18, wherein:
the diameter of said first projection is smaller than the diameter of said second projection.

24. A booster according to claim 23, wherein:
a gap is provided between said first and second projections to connect the vacuum chambers of said two booster units together.

25. A booster according to claim 20, wherein:
a gap is provided between said third projection and said outer wall to connect the working chambers of said two booster units together.

* * * * *